US006594932B2

(12) United States Patent
Hurst, Jr. et al.

(10) Patent No.: US 6,594,932 B2
(45) Date of Patent: Jul. 22, 2003

(54) DISPLAY SIGN MOUNTING SYSTEM

(75) Inventors: Sheldon G. Hurst, Jr., Valdosta, GA (US); Sheldon G. Hurst, III, Valdosta, GA (US)

(73) Assignee: RAK TEK, Inc., Valdosta, GA (US)

( * ) Notice: Subject to any disclaimer, the term of this patent is extended or adjusted under 35 U.S.C. 154(b) by 0 days.

(21) Appl. No.: 09/874,354

(22) Filed: Jun. 6, 2001

(65) Prior Publication Data

US 2002/0112387 A1 Aug. 22, 2002

Related U.S. Application Data

(60) Provisional application No. 60/270,176, filed on Feb. 22, 2001.

(51) Int. Cl.[7] .............................................. G01B 19/00

(52) U.S. Cl. ............................ 40/603; 40/604; 40/514; 160/273.1; 160/378

(58) Field of Search .......................... 40/603, 604, 514, 40/515; 160/271, 272, 273.1, 328, 378

(56) References Cited

U.S. PATENT DOCUMENTS

| | | | | |
|---|---|---|---|---|
| 1,718,183 A | * | 6/1929 | Smith | 160/273.1 |
| 3,280,521 A | | 10/1966 | Keathly | 52/122 |
| 3,373,517 A | | 3/1968 | Halperin | 40/65 |
| 4,478,268 A | * | 10/1984 | Palmer | 160/273.1 |
| 4,800,947 A | | 1/1989 | Loomis | 160/368.1 |
| 4,922,988 A | | 5/1990 | Loomis | 160/368.1 |
| 5,042,182 A | | 8/1991 | King | 40/603 |
| 5,046,545 A | | 9/1991 | Loomis et al. | 160/368.1 |
| 5,349,772 A | | 9/1994 | Pardue | 40/590 |
| 5,373,653 A | | 12/1994 | Suzuki | 40/603 |
| 5,398,436 A | | 3/1995 | Suzuki | 40/558 |
| 5,845,423 A | | 12/1998 | Hicks | 40/603 |
| 6,041,535 A | | 3/2000 | Holloway et al. | 40/603 |
| 6,101,751 A | | 8/2000 | Hicks | 40/590 |

* cited by examiner

*Primary Examiner*—Cassandra H. Davis
(74) *Attorney, Agent, or Firm*—Roylance, Abrams, Berdo & Goodman, L.L.P.

(57) ABSTRACT

A display sign mounting system allows quick and easy mounting and tensioning of a display sign. The display sign has a substantially planar surface to which support members are mounted to form a perimeter frame. Bracket assemblies are attached to the support members. The bracket assemblies retain the substrate and allow for selective tensioning of the substrate to create a taut display as desired. A bracket assembly may have rotatable members to facilitate installation of the substrate. The substrate is wound on a spool assembly to facilitate transporting the substrate to and from a display sign location.

25 Claims, 10 Drawing Sheets

DISPLAY SIGN MOUNTING SYSTEM

RELATED APPLICATIONS

This application claims the benefit of U.S. Provisional No. 60/270,176, filed Feb. 22, 2001.

FIELD OF THE INVENTION

The present invention relates to apparatus for and a method of mounting display signs. More particularly, the present invention relates to apparatus for and a method of adjustably mounting vinyl displays on billboards. Still more particularly, the present invention relates to adjustable and fixed brackets mounted to a surface that receive a vinyl sheet to create a display sign.

BACKGROUND OF THE INVENTION

Display signs have been used for a variety of purposes and in a variety of applications, typically for promoting a business or a product. Conventional billboards generally comprise a planar rigid support surface, or a plurality of such surfaces mounted adjacent one another, upon which the advertising message is painted. Alternatively, the advertising material may be painted or printed on paper or another sheet-like material that is then affixed to the planar rigid support surface, typically by means of adhesives. In many cases, the billboard comprises a freestanding structure mounted on the ground or on a building or the like, and it may be illuminated by spotlights, or the like, to provide visibility during the nighttime. In some cases, advertising material is applied directly to the surfaces of a building structure itself because the building structure cannot support the weight of a billboard support structure. Those types of conventional billboards are very expensive to erect and maintain because preparation and maintenance, in particular, are labor intensive operations. The appearance of conventional billboards is also apt to deteriorate rapidly due to weather conditions such as sun, precipitation, changes in temperature, and the like.

Signs comprising a substantially rigid sheet of transparent or translucent material upon which an advertising message has been applied have also been utilized, generally by mounting them in a cabinet and illuminating the sheet material bearing the advertising message from inside the cabinet. Those types of display signs generally exhibit less deterioration due to weather conditions, but the size of the display sign is quite limited, since transport and installation of a large, substantially rigid sheet is impracticable. In addition, those materials exhibit at least some resiliency, which limits the practical dimensions of the sign, and tends to result in distortion or bowing of the sign due to the weight of the material and due to adverse weather conditions, such as high winds.

Recent innovations in the advertising industry include the use of a flexible, fabric-like sheet material which is light, relatively impervious to weather, and may be illuminated from behind to provide an attractive and effective display. This material is preferably suspended in a taut condition to provide a planar display surface. The costs associated with installation and maintenance of display signs comprising a flexible sheet material are generally less than those associated with conventional signboards and billboards, since the advertising message may be applied at a central location, and the sheet material may be rolled or folded for convenient transport to the display location. The flexible, fabric-like sheet material may be applied over or suspended from a conventional billboard support surface or a building support structure.

Therefore, a need exists for apparatus for and a method of providing quick and efficient mounting and tensioning of display signs.

SUMMARY OF THE INVENTION

Surprisingly, it has been found that provision of a display sign mounting system in accordance with the present invention provides a quick and efficient mounting and tensioning system for display signs.

The present invention includes mounting a support member to the periphery of a substantially planar surface to create a frame corresponding to the desired size of the display. A lower bracket assembly is attached to the lower support member and extends substantially continuously along the lower edge of the frame. The lower bracket assembly includes a lower bracket member that receives a substrate and a fastener that secures the lower bracket member to the lower support member. A nut on the fastener adjusts the distance of the first bracket member from the lower support member, which allows for selective tensioning of the substrate.

A side bracket assembly is attached to each of the side support members and extends substantially continuously along each of the side edges. The side bracket assembly includes a first side bracket member and a second side bracket member that is releasably attached to the second bracket member. A gap is formed between the first and second side bracket members for receiving and retaining the substrate. A fastener secures the first side bracket assembly to the side support member along each of the side edges.

An upper bracket assembly is attached to the upper support member and extends substantially continuously along the upper edge of the frame. The upper bracket assembly includes an upper bracket member having a groove, a channel positioned in the groove, and a first and second series of rotatable members disposed within the channel. A gap is formed between the first and second series of rotatable members for receiving and retaining the substrate therebetween and for facilitating drawing the substrate through the display mounting assembly.

Preferably, the material used for the display sign has a rigid member, such as rope, fixed to the periphery of the material. The material may then be folded or rolled onto a spool and delivered to the location where the display sign is to be constructed. The rigid member secured to the periphery of the material to provide the material with extra width to prevent the material from slipping out of the brackets following insertion of the material into the brackets.

Other advantages and salient features of the invention will become apparent from the following detailed description, which, taken in conjunction with the annexed drawings, discloses preferred embodiments of the invention.

DRAWINGS

Referring now to the drawings that form apart of the original disclosure:

DETAILED DESCRIPTION OF THE INVENTION

Figure 1:
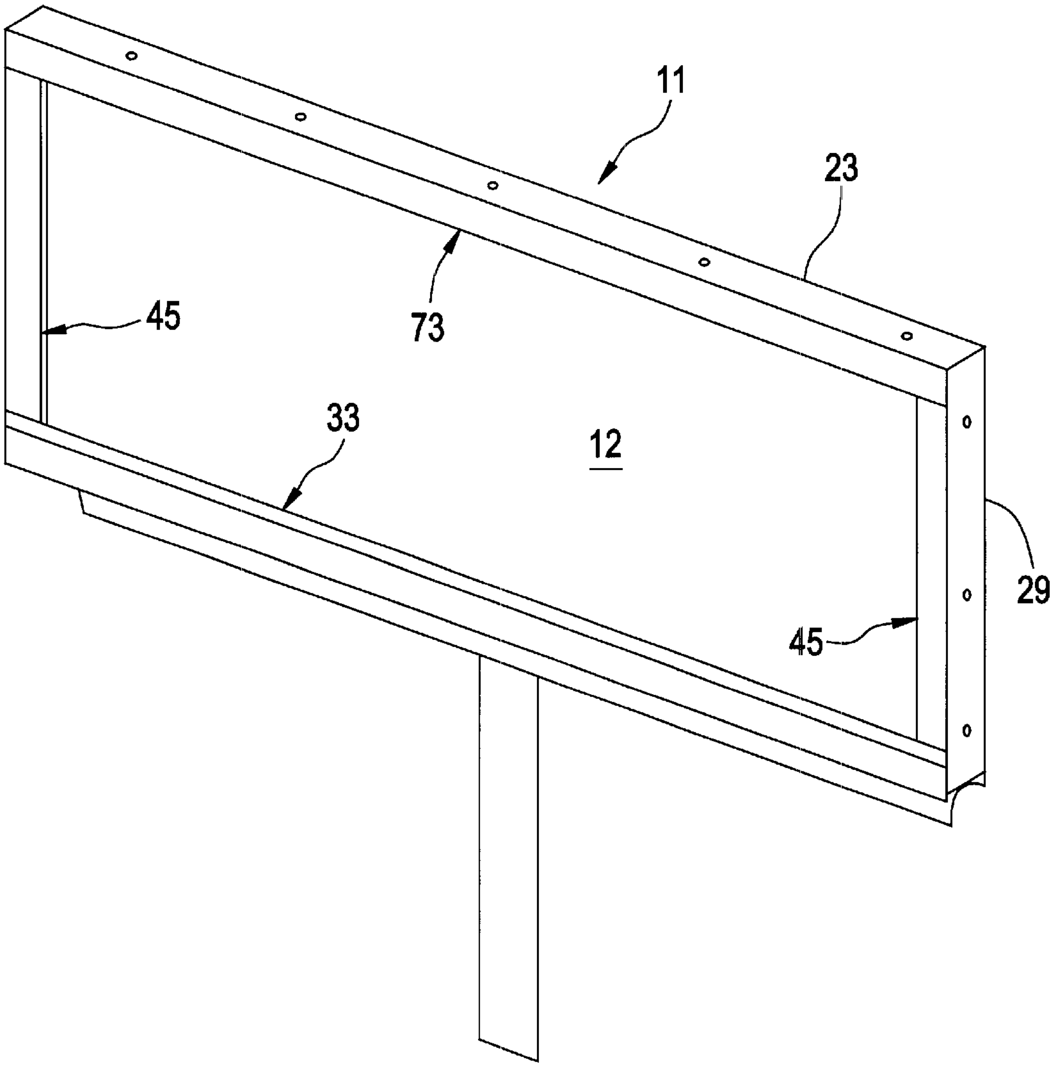
FIG. 1 is a perspective view of a display sign mounting system according to an embodiment of the present invention.
Figure 2:
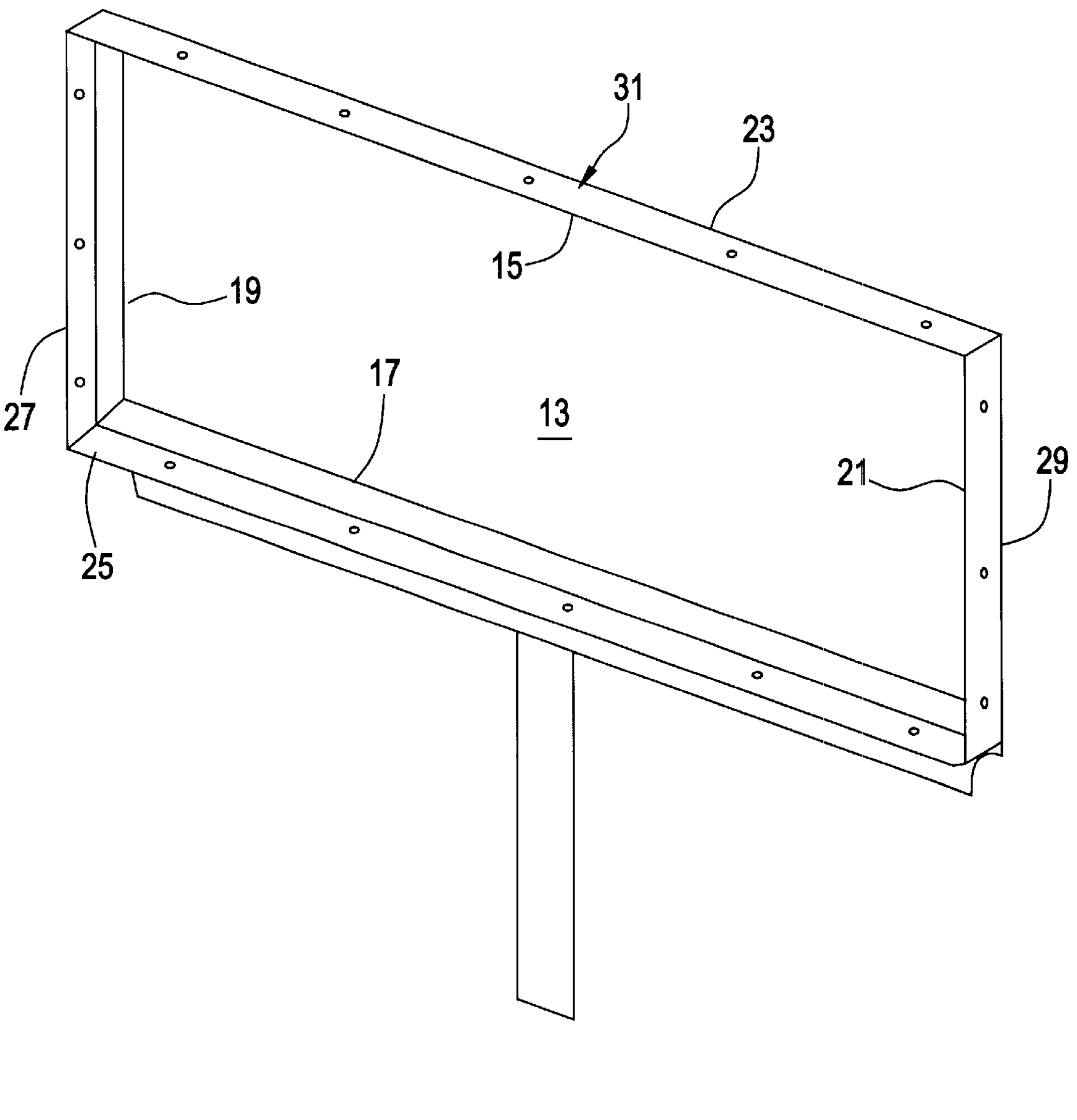
FIG. 2 is a perspective view of the display sign mounting system of FIG. 1, without the substrate and bracket assemblies, having support members mounted along the periphery of a display board.
Figure 3:
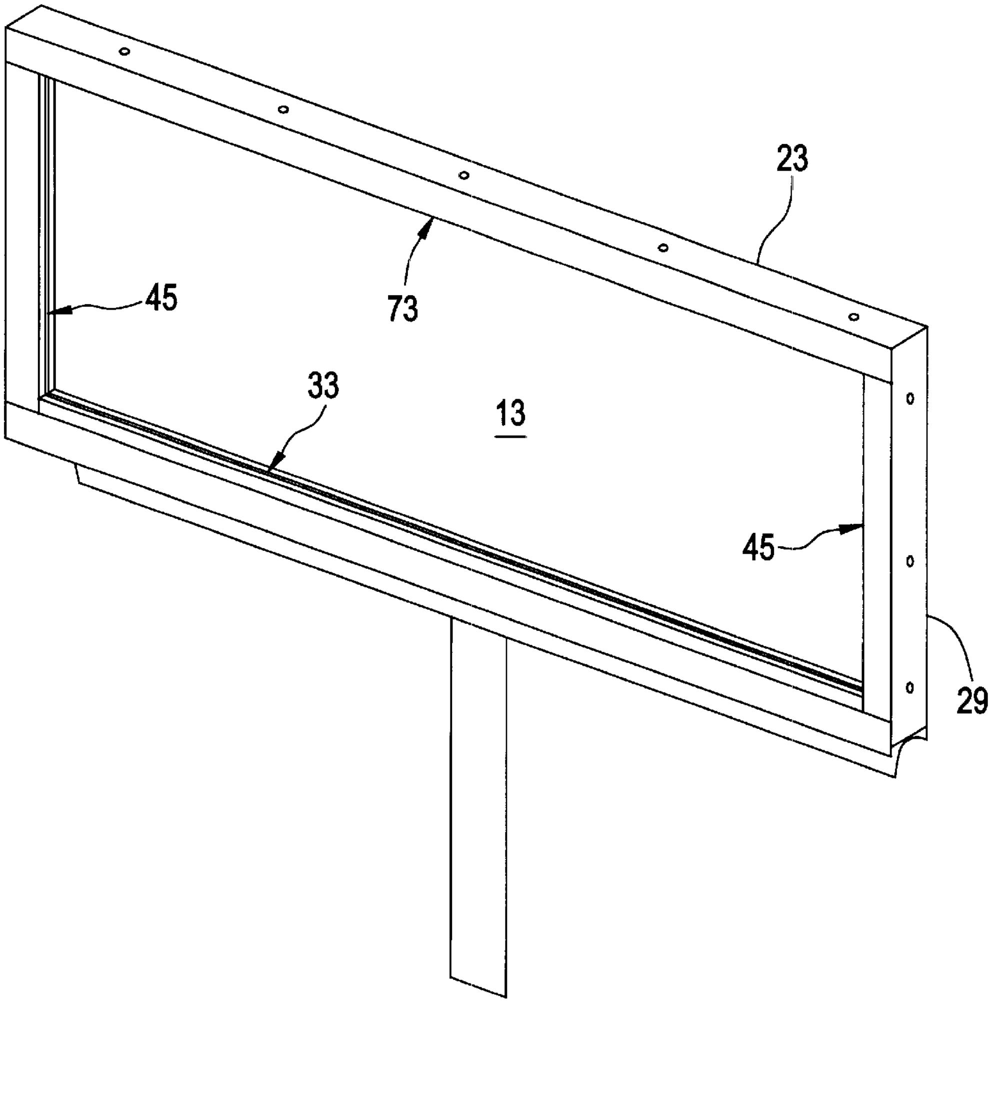
FIG. 3 is a perspective view of mounting brackets attached to the support members of FIG. 2.

As shown in FIGS. 1–20, the present invention relates to assemblies for and methods of quickly and efficiently mounting and tensioning display signs. A display sign 11, as shown in FIG. 1, has a substantially planar surface 13 that has an upper edge 15, a lower edge 17 and two side edges 19 and 21, as shown in FIG. 2. The planar surface does not have to be continuous. For example, the surface may have a hole for passing light through to illuminate the display sign. An upper support member 23 is attached at the upper edge 15 of the surface 13. A lower support member 25 is attached at the lower edge 17 of the surface 13. Side support members 27 and 29 are attached at each of the side edges 19 and 21 of the surface 13. The upper, lower and side support members form a perimeter frame 31 at the periphery of the substantially planar surface 13. Bracket assemblies are attached to each of the support members, as shown in FIG. 3, and preferably extend along the entire length of the edge to which the respective support members are attached. The bracket assemblies retain a flexible substrate 12 and allow for selective tensioning of the substrate to create a taut display.

Figure 16:
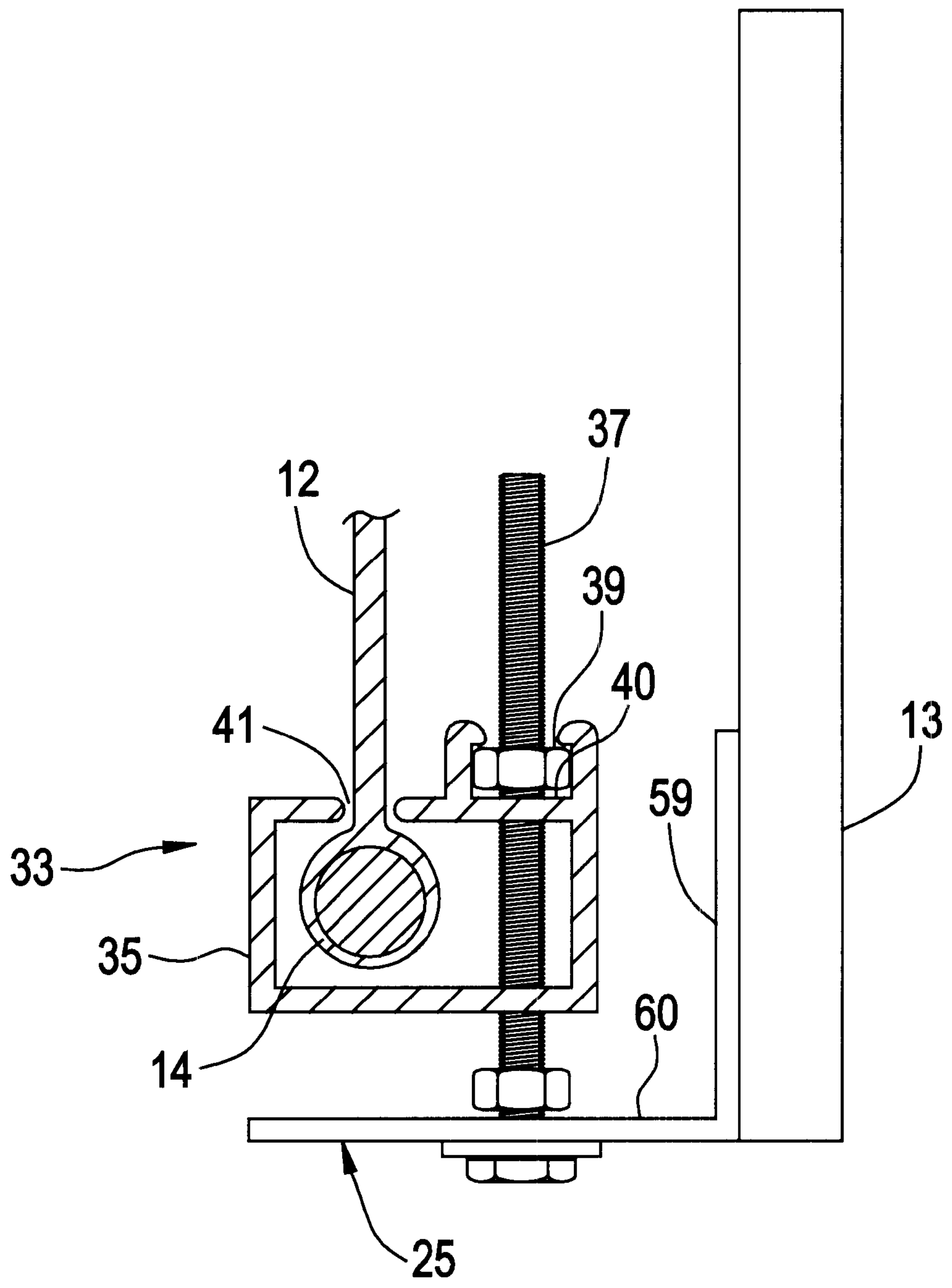
FIG. 16 is a side elevational view in cross-section of a substrate with a rigid member received by a bottom mounting bracket of FIG. 6.

The flexible substrate is a flexible material, for example, vinyl, plastic, a flexible fabric, such as cotton, cotton mesh and wire mesh. The flexible substrate may have media, such as a film, within the substrate for providing an effect to the flexible substrate, for example, causing the substrate to glow to provide better viewing during poor lighting conditions. Preferably, the flexible substrate is a vinyl sheet. Preferably, a rigid member 14 is attached to the periphery of the substrate 12 to facilitate retention of the substrate by the bracket assemblies, as shown in FIG. 16. One such method is to position a rope near the periphery of the substrate so that the substrate may be folded over the rope. The folded over portion of the substrate is then sewn to the substrate, thereby enclosing the rope within the periphery of the substrate.

Figure 4:
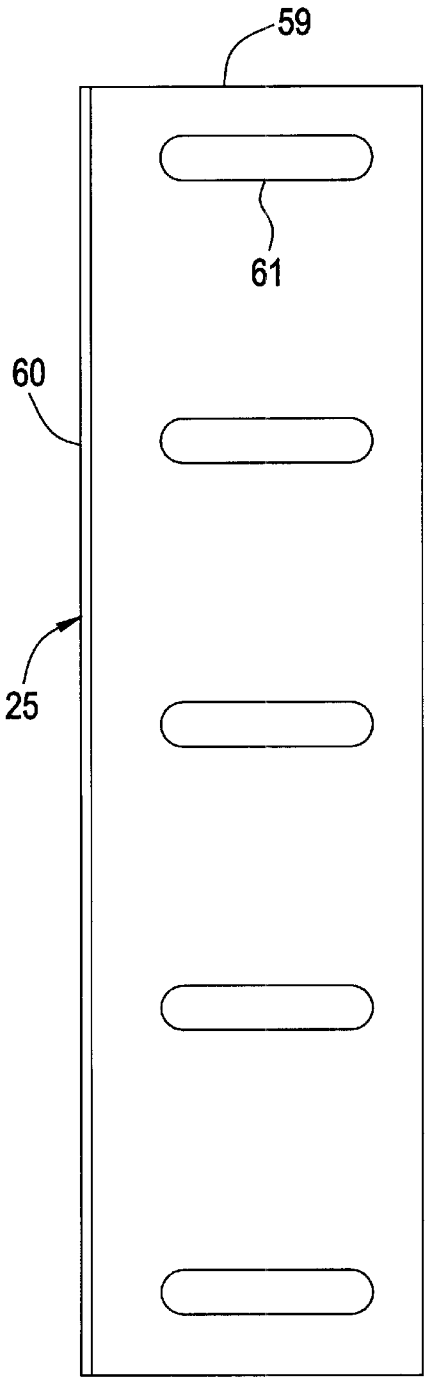
FIGS. 4 and 5 are top and front elevational views, respectively, of a typical section of the support members of FIG. 2.
Figure 5:
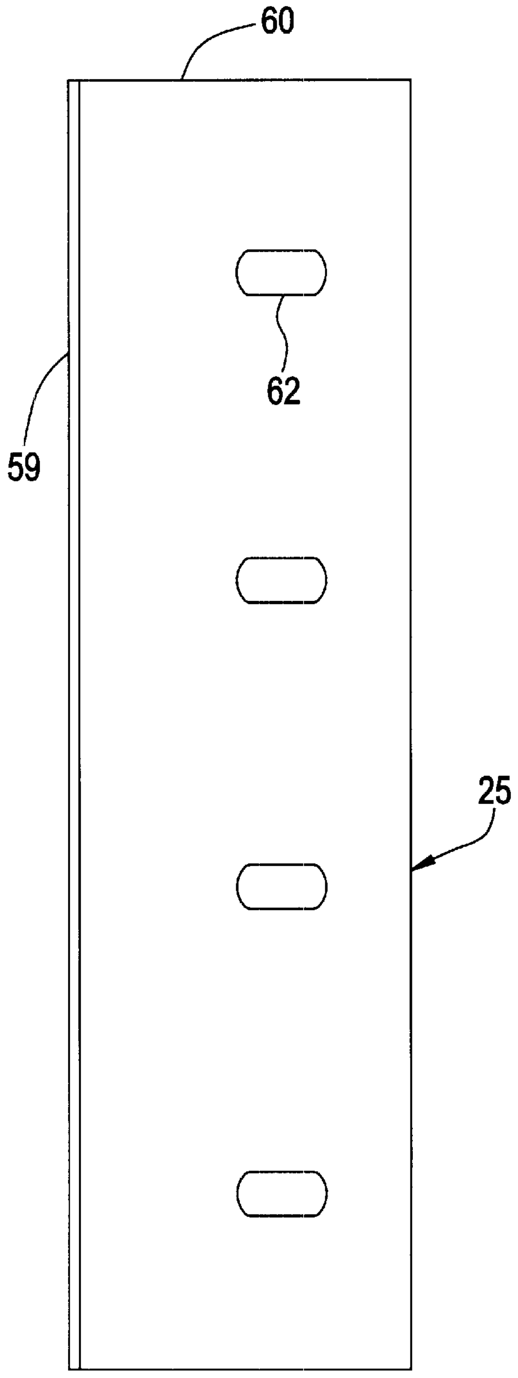

Preferably, the support members 23, 25, 27 and 29 are L-shaped. The support members may be made of any suitable material, such as a metal, including aluminum and iron. Lower support member 25 is shown in FIGS. 4 and 5. Upper and side support members are similar to the lower support member, so only the lower support member will be discussed in detail. The only differences between support members are variations in the length used on each side depending on the size of the display sign to be created. The lower support member 25 is L-shaped and has two faces. A first face is a surface face 59, as shown in FIG. 4, and is attached to the surface 13. Openings 61 in the surface face receive fasteners to secure the support member to the board. Preferably, the openings 61 are elongated such that the support member may be moved with respect to the surface 13 once the fastener has been inserted through the opening 61 and into the board or to adjust the size the display created for surfaces having preexisting fastener holes. The other face of the support member 25 is a bracket face 60, as shown in FIG. 5. Preferably, the bracket face 60 extends substantially perpendicularly from the surface face 59. The bracket face 60 has openings 62 for receiving fasteners for attaching the lower bracket assembly to the lower support member 25. Support members may be of any size, such that a single support member extends along the entire length of the surface 13, or such that more than one support member is required to extend along the entire length of the surface. Alternatively, the support members need not extend along the entire length of a side of the surface. The support members may be spaced along each edge of the surface.

Once the support members have been attached to the surface 13 to form a perimeter frame 31, as shown in FIG. 2, a bracket assembly is attached to the bracket face of each support member. As with the support members, a single bracket assembly may extend along the entire length of the support member to which the bracket assembly is attached, or more than one bracket assembly may be required to extend along the entire length of the support member to which the bracket assembly is attached. FIG. 3 shows a surface 13 to which upper support member 23, lower support member 25 and side support members 27 and 29 have been attached. Bracket assemblies are then attached to the support members.

Figure 6:
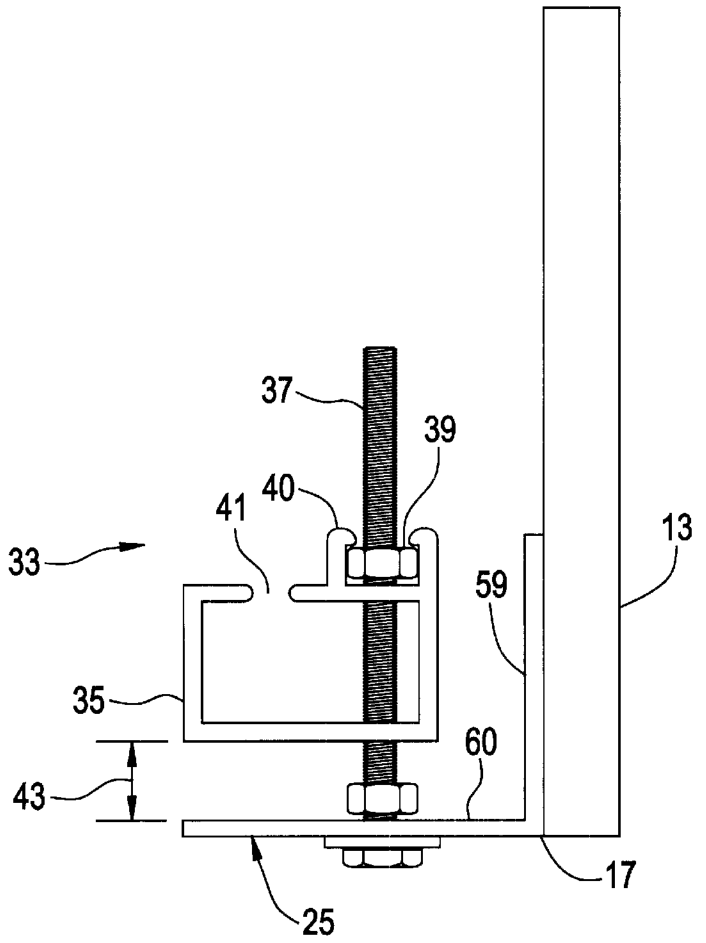
FIG. 6 is a side elevational view of a bottom mounting bracket connected to the support member according to a first embodiment of the present invention.

A lower bracket assembly 33 is attached to the bracket face 60 of the lower support member 25 along the lower edge 17 of the surface 13, as shown in FIG. 6. The lower bracket assembly 33 has a first bracket member 35 for receiving a substrate 12 (FIG. 16). A gap 41 in the lower bracket member 35 is smaller than the largest width of the rigid member 14 attached to the periphery of the substrate 12, as shown in FIG. 16, to retain the substrate within the lower bracket member. A fastener 37 secures the lower bracket member 35 to the bracket face 60 of the lower support member 25. The lower bracket member 35 may be moved along the fastener 37 to selectively tension the substrate once the display sign has been fully assembled. Preferably, a nut 39 is positioned on the fastener 37 that allows a distance 43 between the lower bracket member 35 and the lower support member 25 to be adjusted, thereby selectively tensioning the substrate 12. Preferably, the lower bracket member 35 has a channel 40 for receiving the nut 39. The channel substantially prevents unintentional rotation of the nut relative to the bracket, while allowing the bracket to move axially when the substrate is intentionally tensioned. Adjusting the nut along the fastener 37 in either direction moves the first bracket member 35 with the nut. Enclosing the nut 39 in the channel 40 also prevents undesired movement of the lower bracket assembly 33 due to wind or other forces acting on the substrate 12 once the display sign 11 (FIG. 1) has been assembled, since both the lower bracket member 35 and the nut 39 must be moved along the fastener 37.

Figure 7:
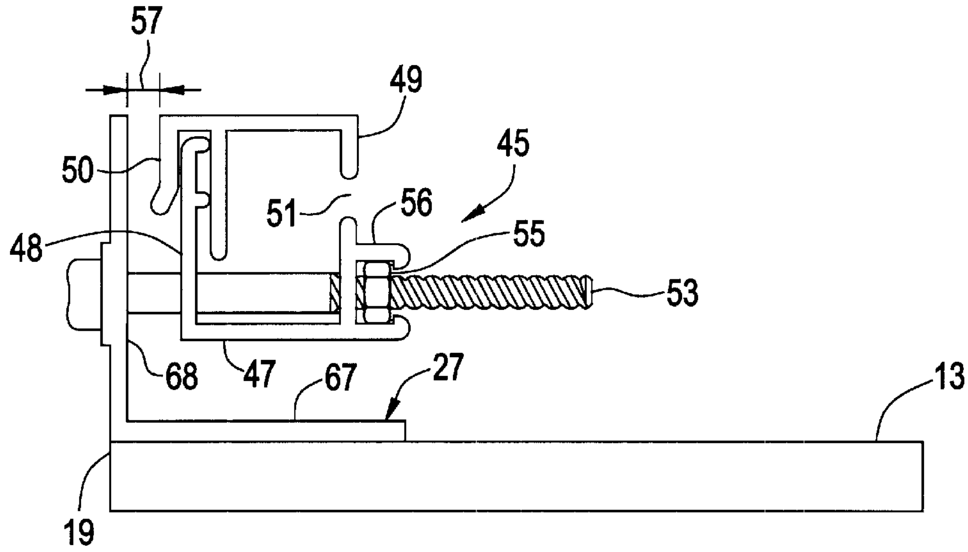
FIG. 7 is a top plan view of a side mounting bracket connected to the support member, according to a first embodiment of the present invention.

A side bracket assembly 45 is attached to the bracket faces 68 of each of the side support members 27 and 29 along each of the side surface edges 19 and 21, as shown in FIG. 7 (showing only side support member 27 as side support members 27 and 29 are identical). The side bracket assembly 45 includes a first side bracket member 47 and a second side bracket member 49 that is releasably attached to the first side bracket member. When the first and second side bracket members are releasably connected, as shown in FIG. 7, a gap 51 is formed therebetween for receiving and retaining the substrate 12 (similar to FIG. 16). A fastener 53 secures each of the side bracket assemblies 45 to the respective side support members 27 and 29. The first side bracket member may be moved along the fastener to selectively tension the substrate once the display sign has been fully assembled. Preferably, a nut 55 is positioned on the fastener 53 that allows a distance 57 between the second bracket member 47 and the side support member 27, 29 to be adjusted, thereby selectively tensioning the substrate 12. Preferably, the first side bracket member 47 has a channel 56 for receiving the nut 55 (similar to nut 39 and channel 40) so that adjusting the nut along the fastener 53 in either direction moves the first and second side bracket members 47 and 49 with the nut.

Figure 8:
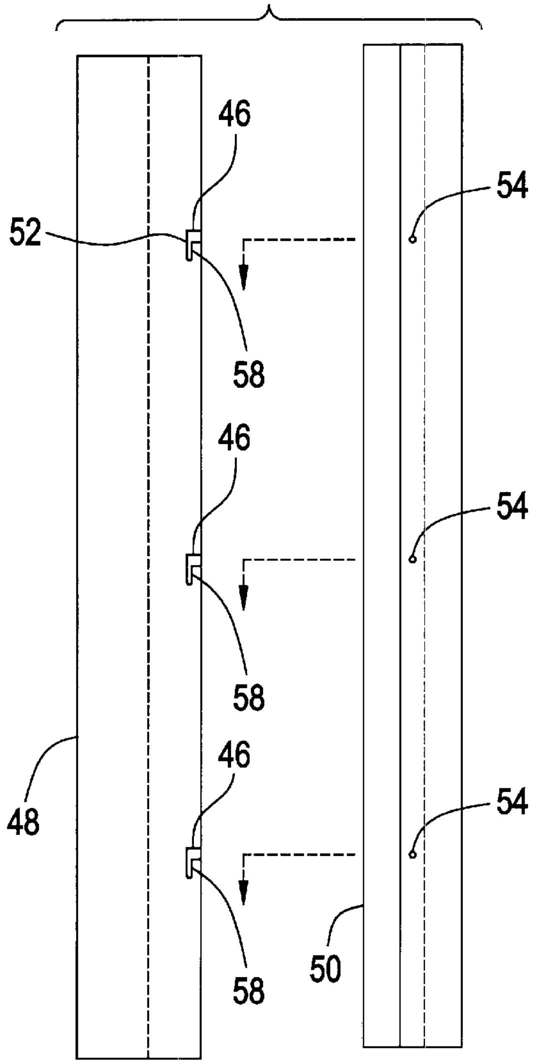
FIG. 8 is an exploded top plan view of the first and second bracket members of the side mounting bracket of FIG. 7.
Figure 9:
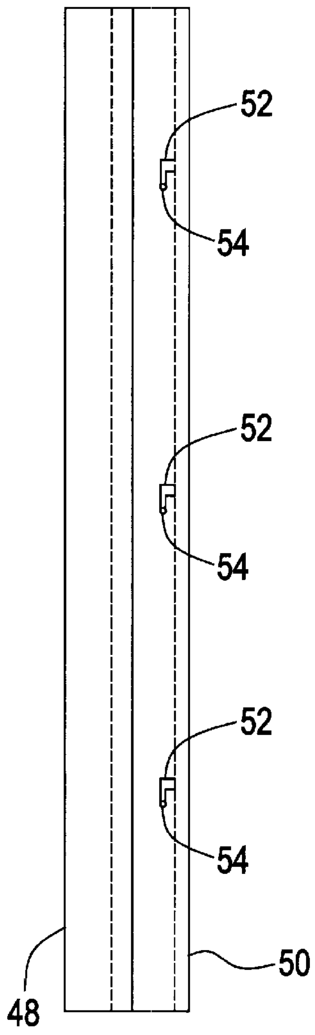
FIG. 9 is top plan view of the first and second bracket members of FIG. 8 connected together.
Figure 10:
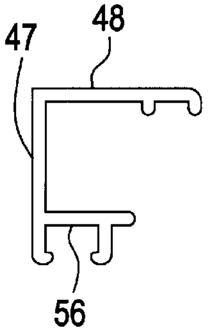
FIGS. 10, 11 and 12 are end elevational views of the first bracket member, the second bracket member, and the first and second bracket members connected together, respectively.
Figure 11:
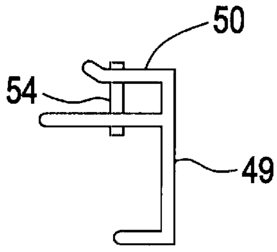
Figure 12:
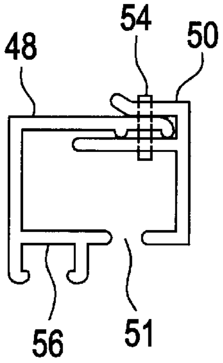

FIGS. 8–12 show the second side bracket member 49 being releasably attached to the first side bracket member 47. The top surface 48 of the second bracket member 47 has at least one notch 52, as shown in FIG. 8. Preferably, the notches 52 are L-shaped and have a first leg 46 of the notch substantially perpendicular to a second leg 58 of the notch. The top surface 50 of the second side bracket member 49 has at least one rivet 54 adapted to engage the notches 52 in the first side bracket member 47, as shown in FIG. 8. The second side bracket member 49 is aligned with the first side bracket member 47 so that the rivets 54 correspond to the first legs 46 of the notches 52. The rivets 54 are then inserted into the first legs 46 of the notches 52, and then slid perpendicularly into the second legs 58 of the notches to lock the second side bracket member 49 to the first side bracket member 47.

Figure 13:
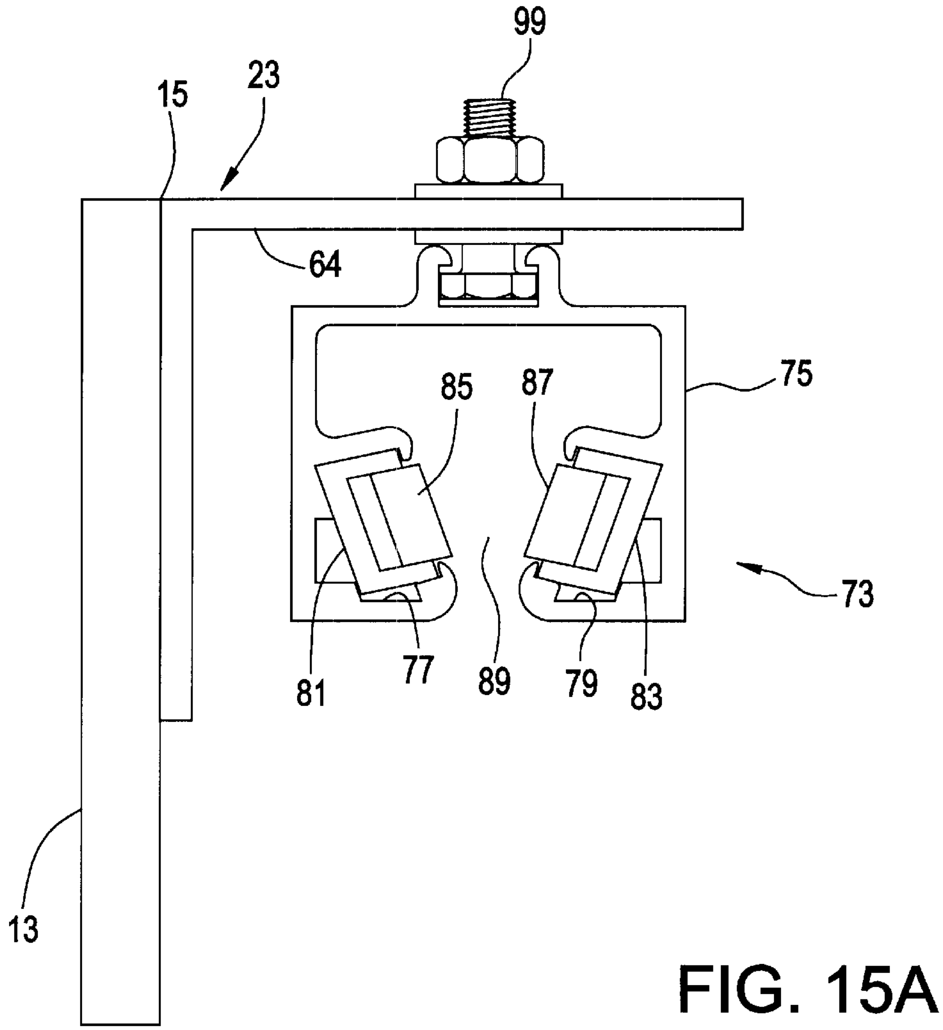
FIG. 13 is a side elevational view of a top mounting bracket connected to the support member, according to a first embodiment of the present invention.
Figure 15A:
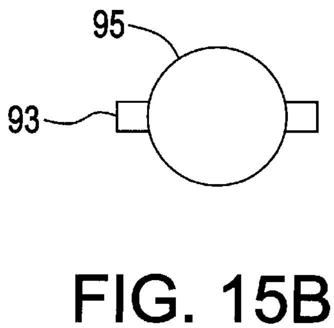
FIGS. 15A and 15B are front elevational views of ball bearings and roller bearings, respectively, used in the channel of FIG. 14.
Figure 14:
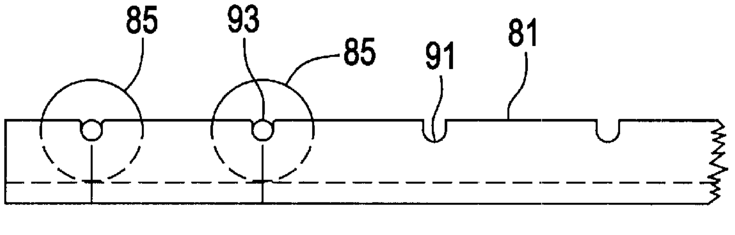
FIG. 14 is a side elevational view of a channel member of the top mounting bracket of FIG. 13.
Figure 15B:
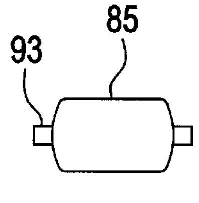

An upper bracket assembly 73 is attached to the bracket face 64 of the upper support member 23 along the upper edge 15 of the surface 13, as shown in FIG. 13. The upper bracket assembly 73 includes an upper bracket member 75 that has at least one groove 77. Preferably, as shown in FIG. 13, the upper bracket member 75 has a first groove 77 and a second groove 79. A first channel 81 is positioned in the first groove 77 and a second channel 83 is positioned in the second groove 79. A first series of rotatable members 85 is disposed within the first channel 81 and a second series of rotatable members 87 is disposed within the second channel 83. A gap 89 is formed between the first and second series of rotatable members 85 and 87 for receiving and retaining the substrate. The gap 89 is smaller than the diameter of the rigid member attached to the periphery of the substrate, thereby preventing the substrate from being pulled out of the upper bracket member 75. The rotatable members 85 and 87 facilitate installation of the substrate by reducing the friction that must be overcome when drawing the substrate through the display mounting assembly. Preferably, the rotatable members are roller bearings 95 or ball bearings 85, as shown in FIGS. 15A and 15B. Each rotatable member has a pin 93 that is received by a notch 91 in the channels 81 and 83. A fastener 99 secures the upper bracket member 75 to the bracket face 64 of the upper support member 23.

Figure 17:
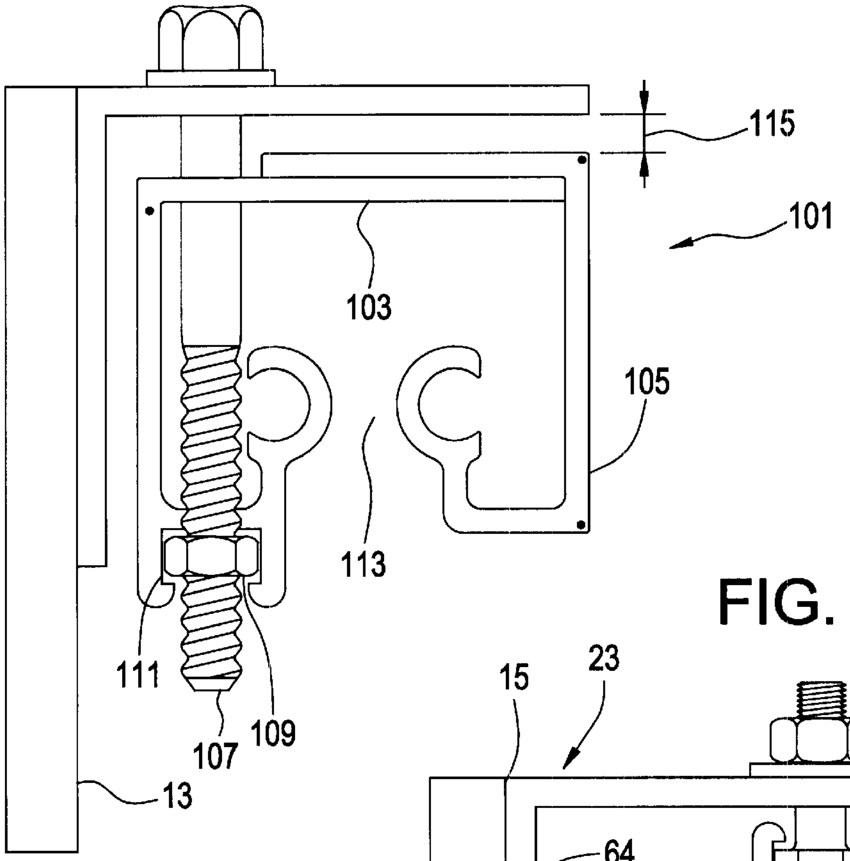
FIG. 17 is top view of a bottom and side mounting bracket connected to the support member, according to a second embodiment of the present invention.

In a second embodiment of the invention, the lower and side bracket assemblies 33 and 73 attached to the lower and side support members 25, 27 and 29, respectively, are replaced by a single adjustable bracket assembly 101, as shown in FIG. 17. The adjustable bracket assembly 101 has a first bracket member 105 that is releasably connected to a second bracket member 103. The first and second bracket members 103 and 105 may be attached in a manner similar to that described above for the first and second side bracket members 47 and 49 of the side bracket assembly 45. Alternatively, a fastener may be used to connect the first and second bracket members 47 and 49. When the first and second bracket members are releasably connected, as shown in FIG. 17, a gap 113 is formed therebetween for receiving and retaining the substrate 12. A fastener 107 secures each of the adjustable bracket assemblies 101 to the respective support members 25, 27 or 29. The first bracket member 105 may be moved along the fastener 107 to selectively tension the substrate once the display sign has been fully assembled. Preferably, a nut 109 is positioned on the fastener 107 that allows a distance 115 between the second bracket member 105 and the respective support member 25, 27, or 29 to be adjusted, thereby selectively tensioning the substrate 12. Preferably, the first bracket member 103 has a channel 111 for receiving the nut 109 so that adjusting the nut along the fastener 107 in either direction moves the first and second bracket members 103 and 105 with the nut.

Figure 18:
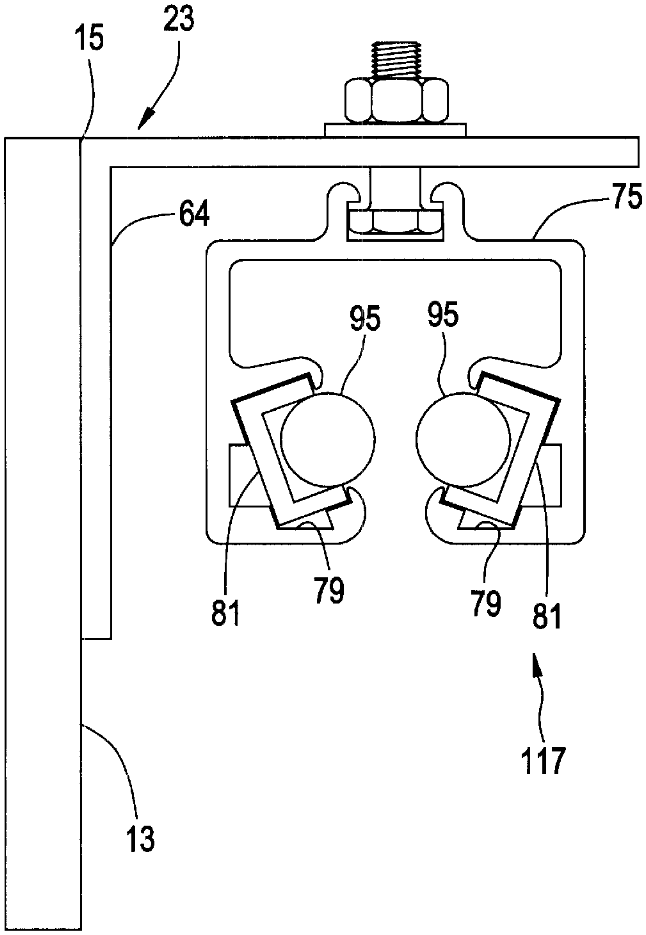
FIG. 18 is a side view of a top mounting bracket connected to the support member, according to a second embodiment of the present invention.

An upper bracket assembly 117 in the second embodiment of the invention replaces the upper bracket assembly of the first embodiment. The upper bracket assembly 117 of the second embodiment is attached to the bracket face 64 of the upper support member 23 and extends substantially continuously along the upper edge 15 of the surface 13, as shown in FIG. 18. The upper bracket assembly 117 is identical to the upper bracket assembly 73 of the first embodiment, except that roller bearings 95 are used as the rotatable members.

Installation is the same for both embodiments of the invention. For reasons of simplicity, installation and removal of a flexible substrate will be discussed with reference to the first embodiment of the invention depicted in FIGS. 1–16.

Figure 19:
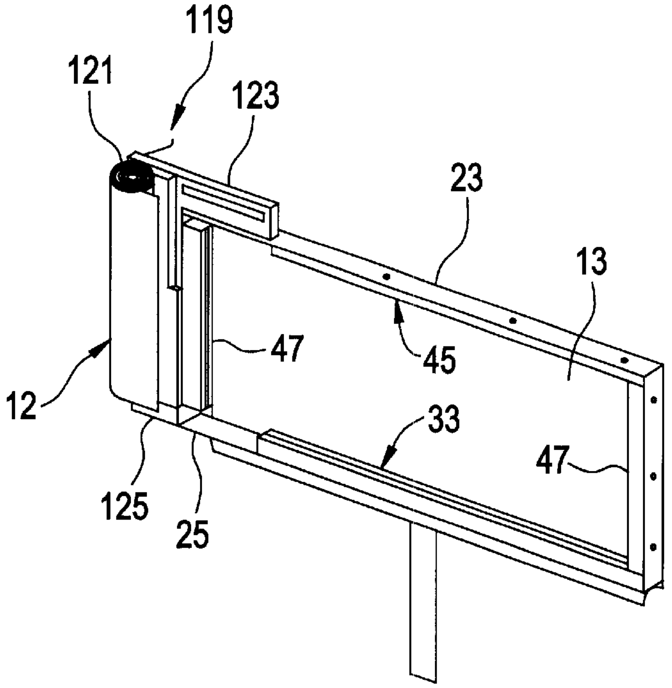
FIGS. 19 and 20 are perspective views of a sign feeder system used to feed and retrieve display sign material into and from the display sign mounting system.
Figure 20:
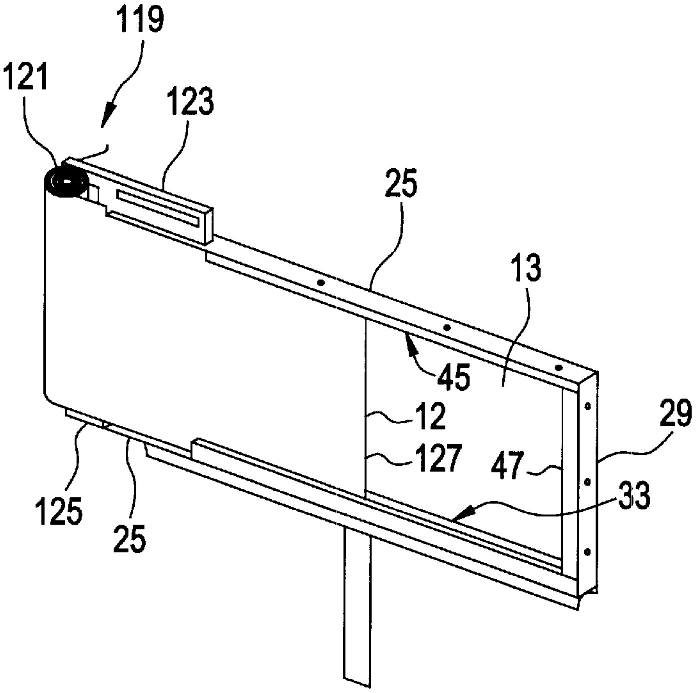

Preferably, the substrate 12 is rolled onto a spool for transport to a mounting location once the rigid member has been attached to the periphery of the substrate. The spool assembly 119 is easily mounted to the upper and lower support members, as shown in FIG. 19. The entirety of the second side bracket member 49 is temporarily removed from the first side bracket member 47 of the second bracket assembly along both of the side support members 27 and 29. A section of each of the upper and lower bracket assemblies 33 and 73 are temporarily removed from the upper and lower support members 23 and 25 so that the spool extension arms may be attached. Upper spool extension 123 and lower spool extension 125 are attached to the upper and lower support members 23 and 25, respectively. The substrate 12 is then fed into the upper and lower bracket assemblies 33 and 73, as shown in FIG. 20. The rigid member in the upper and lower edges of the substrate is retained within the bracket assemblies since the diameter of the rigid member is larger than the gaps (41 and 89 of FIGS. 6 and 13). The first and second series of rotatable members (85 and 87 of FIG. 13) facilitate drawing the substrate through the upper and lower bracket assemblies. Preferably, the substrate 12 has been manufactured to match the size of the display sign so that when the first substrate end 127 reaches the first side bracket member 47 along right-hand support member 29, the opposite end of the substrate is aligned with the first side bracket member 47 along left-hand support member 27. When the substrate 12 has been fully unrolled from the spool 121, the second side bracket members 49 are reattached to the first side bracket members 47, thereby capturing the rigid member of the substrate within each of the side bracket assemblies 45. The substrate is retained within the side bracket assembly 45 since the diameter of the rigid member is larger than the gap 51 between the first side and second side bracket members 47 and 49 of the side bracket assembly 45 (FIG. 7). The removed portions of the upper and lower support members 23 and 25 are reattached once the spool assembly has been removed, providing a display sign 11 as shown in FIG. 1.

Once the bracket assemblies have been reattached and the substrate 12 is fully retained within the bracket assemblies, the lower and side bracket assemblies 33 and 45 along the lower and side support members 25, 27 and 29 may be selectively adjusted to obtain proper tensioning of the substrate to provide a taut display sign, as shown in FIG. 1. Adjustments are made by moving a bracket member along its fastener. If an adjusting nut is used, then the nut 39, 55 or 109 is adjusted along fastener 37, 53 or 107, respectively, to obtain the desired tension of the substrate. Threading the nut toward the support member to which the bracket assembly is attached increases the tension of the substrate, while threading the nut away from the support member to which the bracket assembly is attached loosens the substrate within the sign. The adjustable bracket assemblies allow quick and easy tensioning of the substrate of the display sign at any time.

The process of installing the substrate may be performed in reverse order to remove the substrate from the bracket assemblies and onto a spool 121. This allows for quick and easy changing of the substrate 12 of the display sign 11, thereby providing a versatile display sign. Wrapping the substrate on the spool assembly also facilitates transporting the substrate to and from a display sign location.

As used in this application, directions are intended to facilitate the description of the display sign mounting system of the present invention. Such terms are merely illustrative of the display sign mounting system of the present invention and do not limit the invention to any specific orientation.

While advantageous embodiments have been chosen to illustrate the invention, it will be understood by those skilled in the art that various changes and modifications may be made therein without departing from the scope of the invention as defined in the appended claims.

What is claimed is:

1. A display mounting assembly, comprising:

a substantially planar support surface having an upper edge, a lower edge and two side edges;

upper, lower and first and second side support members attached proximal to said upper, lower and side edges of said surface to form a perimeter;

a lower bracket assembly attached to said lower support member and extending substantially continuously along said lower edge, said lower bracket assembly, including:

a lower bracket member for receiving a substrate; and a fastener for securing said lower bracket member to said support member, wherein said lower bracket member is movable along said fastener for selectively tensioning the substrate;

a side bracket assembly attached to each said support member along each of said side edges and extending substantially continuously along each of said side edges, said side bracket assembly, including:

a first side bracket member;

a second side bracket member releasably attached to said first side bracket member, said first and second side bracket members forming a gap therebetween when connected for receiving and retaining the substrate; and a fastener for securing said first side bracket member to said support member along each of said side edges, wherein said first side bracket member is movable along said fastener for selectively tensioning the substrate; and an upper bracket assembly attached to said support member at said upper edge and extending substantially continuously along said upper edge, said upper bracket assembly, including:

an upper bracket member having a groove;

a channel positioned in said upper bracket member groove; and a first and second series of rotatable members disposed within said channel, a gap being formed between said first and second series of rotatable members for receiving and retaining the substrate and for facilitating drawing said substrate through said display mounting assembly.

2. The assembly of claim 1, wherein each of said support members are substantially L-shaped in transverse cross section.

3. The assembly of claim 1, wherein said support members are angle irons.

4. The assembly of claim 1, wherein said first and second series of rotatable members are selected from a group consisting of ball bearings and roller bearings.

5. The assembly of claim 1, wherein said upper bracket member has two grooves, a channel positioned in each of said grooves, and a series of rotatable members positioned in each of said channels.

6. The assembly of claim 1, further comprising a roller assembly attached to said upper and lower support members for feeding and retrieving the substrate into and from said display mounting assembly.

7. The assembly of claim 1, wherein said second side bracket member has a rivet and said first side bracket member has a notch for receiving said second side bracket member rivet.

8. The assembly of claim 7, wherein said first side bracket member notch is substantially L-shaped.

9. The assembly of claim 1, further comprising a nut on said lower bracket assembly fastener for controlling tensioning of the substrate.

10. The assembly of claim 9, further comprising a channel in said lower bracket member for receiving said nut and fixing said nut axially relative to said lower bracket member.

11. The assembly of claim 1, further comprising a nut on each of said side bracket assembly fasteners for controlling tensioning of the substrate.

12. The assembly of claim 11 further comprising a channel in each of said side bracket members for receiving said nut and fixing said nut axially relative to said side bracket member.

13. A display mounting assembly, comprising:

a substantially planar support surface having an upper edge, a lower edge and two side edges;

upper, lower, and first and second side support members attached proximal to each of said four edges of said surface to form a perimeter;

lower and side bracket assemblies attached to said lower and side support members, respectively, and extending substantially continuously along said respective support members, each of said lower and side bracket assemblies, including first and second bracket members releasably connected together, said first and second bracket members forming a gap therebetween when connected for receiving and retaining a substrate; and a fastener for securing each said first bracket member to said support member, said first bracket member being movable along said fastener for selectively tensioning the substrate;

an upper bracket assembly attached to said upper support member and extending substantially continuously along said upper support member, said upper bracket assembly, including:

a third bracket member having a groove;

a fastener for securing said third bracket member to said upper support member;

a channel positioned in said third bracket member groove; and a first and second series of rotatable members disposed within said channel, a gap being formed between said first and second series of rotatable members for receiving and retaining the substrate and for facilitating drawing the substrate through said display mounting assembly.

14. The assembly of claim 13, wherein each of said support members are substantially L-shaped in transverse cross section.

15. The assembly of claim 13, wherein said support members are angle irons.

16. The assembly of claim 13, wherein said first and second series of rotatable members are selected from a group consisting of ball bearings and roller bearings.

17. The assembly of claim 13, wherein said third bracket member has two grooves, a channel positioned in each of said grooves, and a series of rotatable members positioned in each of said channels.

18. The assembly of claim 13, further comprising a roller assembly attached to said upper and lower support members for feeding and retrieving the substrate into and from said display mounting assembly.

19. The assembly of claim 13, further comprising a nut on each said lower and side bracket assembly fasteners to control the selective tensioning of the substrate.

20. The assembly of claim 19, further comprising a channel in each of said first bracket members for receiving said nut and fixing said nut axially relative to said first bracket members.

21. A method of mounting a display sign, comprising the steps of:

attaching an upper, lower and two side support members to an upper, lower and two side edges, respectively, of a substantially planar support surface;

attaching a lower bracket assembly to said lower support member at said lower edge, said lower bracket assembly being a first distance from said lower support member and extending substantially continuously along said lower edge;

attaching an upper bracket assembly to said upper support member at said upper edge, said upper bracket assembly being a second distance from said upper support member and extending substantially continuously along said upper edge;

attaching a side bracket assembly to each said of said two side support members at said side edges, said side bracket assemblies being a third and fourth distance, respectively, from said side support members and extending substantially continuously along each of said side edges;

attaching a roll assembly containing a flexible substrate having a perimeter to said upper and lower support members;

unwinding said flexible substrate from a spool of said roll assembly and drawing said substrate through said upper and lower bracket assemblies;

enclosing said perimeter of said flexible substrate within both said side bracket assemblies;

adjusting tension of said flexible substrate by varying distances between said upper, lower and side bracket assemblies and said upper, lower and side support members, respectively; and removing said roll assembly from said upper and lower support members.

22. The method of claim 21, further comprising:

reattaching said roll assembly to said upper and lower support members;

removing said flexible substrate from both of said side bracket assemblies; and feeding said flexible substrate through said upper and lower bracket assemblies and winding said flexible substrate onto said spool of said roll assembly.

23. The method of claim 21, further comprising feeding said flexible substrate through a plurality of rotatable members disposed substantially within said upper bracket assembly to facilitate said drawing said flexible substrate through said lower and upper bracket assemblies.

24. The method of claim 21, wherein attaching said lower, upper and side bracket assemblies to said lower, upper and side support members, respectively, comprises attaching each of said bracket assemblies with a bolt and a nut, said nut fixed axially relative said bracket assembly; and adjusting tension by moving said nut along said bolt and varying said distances.

25. A display mounting assembly, comprising:

a substantially planar support surface having an upper edge, a lower edge and two side edges;

upper, lower and first and second side support members attached proximal to said upper, lower and two side edges, respectively, to form a perimeter;

a first bracket assembly attached to said lower and side support members, said first bracket assembly, including:

a first bracket member adapted to receive a substrate; and a fastener for attaching said first bracket member to said lower and side support members, said first bracket member being movable along said fastener for selectively tensioning said substrate; and a second bracket assembly attached to said upper support member, said second bracket assembly including a second bracket member adapted to receive a substrate;

a fastener for attaching said second bracket member to said upper support member;

rotatable members disposed within said second bracket member for facilitating moving said substrate through said first and second bracket assemblies.

* * * * *